(12) United States Patent
Takikawa (10) Patent No.: US 11,389,975 B2
(45) Date of Patent: Jul. 19, 2022

(54) SPRING BALANCER APPARATUS AND METHOD FOR DISASSEMBLING THE SAME

(71) Applicant: FANUC CORPORATION, Yamanashi (JP)

(72) Inventor: Ryuji Takikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 456 days.

(21) Appl. No.: 16/674,872

(22) Filed: Nov. 5, 2019

(65) Prior Publication Data

US 2020/0147815 A1     May 14, 2020

(30) Foreign Application Priority Data

Nov. 14, 2018   (JP) .............................. JP2018-213988

(51) Int. Cl.
     *B25J 19/00*          (2006.01)
     *F16F 15/00*        (2006.01)

(52) U.S. Cl.
     CPC ........... *B25J 19/0016* (2013.01); *F16F 15/00* (2013.01); *F16F 2230/0011* (2013.01)

(58) Field of Classification Search
     CPC .......................... B25J 19/0008; B25J 19/0016
     See application file for complete search history.

(56) References Cited

U.S. PATENT DOCUMENTS

| 2,995,327 | A | * | 8/1961 | Joseph | ................... | F16L 3/2053 |
| | | | | | | 267/71 |
| 3,944,196 | A | * | 3/1976 | Schwartzkopf | ......... | F16F 1/128 |
| | | | | | | 267/168 |

(Continued)

FOREIGN PATENT DOCUMENTS

| DE | 10007251 A1 | 8/2001 |
| DE | 102010005103 A1 | 7/2011 |

(Continued)

OTHER PUBLICATIONS

Japanese Office Action dated Oct. 27, 2020, in connection with corresponding JP Application No. 2018-213988 (5 pp., including machine-generated English translation).

(Continued)

*Primary Examiner* — Jake Cook
(74) *Attorney, Agent, or Firm* — Maier & Maier, PLLC (57) ABSTRACT

In a spring balancer apparatus, a flange includes a through-hole and a first and second flange member, the first flange member positioned radially inside a compression spring and removably held on another end of the shaft by a first nut member fastened to a first external thread on the shaft, the second flange member including a central hole and removably fixed to an outer periphery of the first flange member from a rear end plate side. The rear end plate of a casing includes an abutting part on which an outer periphery of the second flange member abuts, and an opening through which a surface of the second flange member is externally exposed at a position radially inside the abutting part and radially outside the central hole. At least one of a front end plate and the rear end plate is removably fixed to a cylindrical body of the casing.

4 Claims, 10 Drawing Sheets

(56) References Cited

U.S. PATENT DOCUMENTS

| | | | |
|---|---|---|---|
| 6,564,667 B2 * | 5/2003 | Bayer | B25J 19/0016 |
| | | | 901/48 |
| 6,848,333 B2 | 2/2005 | Lundström et al. | |
| 2001/0022110 A1 | 9/2001 | Roland | |
| 2001/0022112 A1 | 9/2001 | Bayer et al. | |
| 2004/0093975 A1 | 5/2004 | Spa | |

FOREIGN PATENT DOCUMENTS

| | | |
|---|---|---|
| EP | 0947296 A2 | 10/1999 |
| EP | 1419857 A1 | 5/2004 |
| JP | H02110488 U | 9/1990 |
| JP | H05200690 A | 8/1993 |
| JP | H11-216697 A | 8/1999 |
| JP | H11277479 A | 10/1999 |
| JP | 2001-225293 A | 8/2001 |
| JP | 2002283274 A | 10/2002 |
| WO | 3141978 A1 | 6/2001 |

OTHER PUBLICATIONS

Japanese Search Report dated Oct. 21, 2020, in connection with corresponding JP Application No. 2018-213988 (12 pp., including machine-generated English translation).

Office Action dated Apr. 22, 2022, in connection with corresponding German Application No. 102019130064.9 (14 pp., including machine-generated English translation).

\* cited by examiner

SPRING BALANCER APPARATUS AND METHOD FOR DISASSEMBLING THE SAME

CROSS-REFERENCE TO RELATED APPLICATIONS

This application is based on Japanese Patent Application No. 2018-213988, the content of which is incorporated herein by reference.

FIELD

The present invention relates to a spring balancer apparatus and a method for disassembling the spring balancer apparatus.

BACKGROUND

A known spring balancer apparatus used for assisting power of an industrial robot has a compression spring inside thereof, which is initially loaded with a compression force before the spring balancer apparatus is mounted on the industrial robot (e.g., see Japanese Unexamined Patent Application, Publication No. 11-277479). In disassembling such a spring balancer apparatus for disposal or other purposes, a press machine or the like has been used to relieve the compression force of the compression spring.

SUMMARY

An aspect of the present invention is directed to a spring balancer apparatus including: a casing including a cylindrical body, a front end plate, and a rear end plate, the front end plate and the rear end plate being positioned to close respective ends of the cylindrical body; a shaft positioned to pass through the front end plate in a plate thickness direction so as to be movable in a longitudinal direction; an attachment block fixed to one end of the shaft, the one end of the shaft being positioned outside the casing; a flange fixed to another end of the shaft, the another end of the shaft being positioned inside the casing; and a compression spring positioned in a compressed state between the front end plate and the flange, wherein the another end of the shaft is provided with a first external thread, the flange includes a through-hole allowing for passage of the shaft, and further includes a first flange member and a second flange member, the first flange member being positioned radially inside the compression spring, the first flange member being removably held on the another end of the shaft by a first nut member fastened to the first external thread, the second flange member including a central hole allowing for passage of the first nut member, the second flange member being removably fixed to an outer periphery of the first flange member from the rear end plate side by a fastening tool, the rear end plate includes an abutting part on which an outer periphery of the second flange member abuts, and an opening through which a surface of the second flange member is externally exposed at a position radially inside the abutting part and radially outside the central hole, and at least one of the front end plate and the rear end plate is removably fixed to the cylindrical body.

Another aspect of the present invention is directed to a method for disassembling the spring balancer apparatus having any one of the above aspects, the method including: removing the first nut member and the fastening tool in a state in which the second flange member is abutted against the abutting part; fastening the first external thread to the internal thread to push the attachment block against an outer surface of the front end plate in a state in which a front end face of a cylindrical jig is abutted against a surface of the first flange member, the cylindrical jig including an inner hole provided with an internal thread for fastening of the first external thread thereto, the cylindrical jig including an outer surface smaller in outer diameter than a diameter of the central hole and provided with a second external thread engaged with a second nut member, and in this state; fastening the second nut member relative to the second external thread until the second nut member abuts on the surface of the second flange member; separating the front end plate or the rear end plate from the cylindrical body; and loosening the second nut member.

DETAILED DESCRIPTION

Below a description will be given of a spring balancer apparatus 1 and a method for disassembling the spring balancer apparatus 1 according to one embodiment of the present invention with reference to the drawings.

Figure 1:
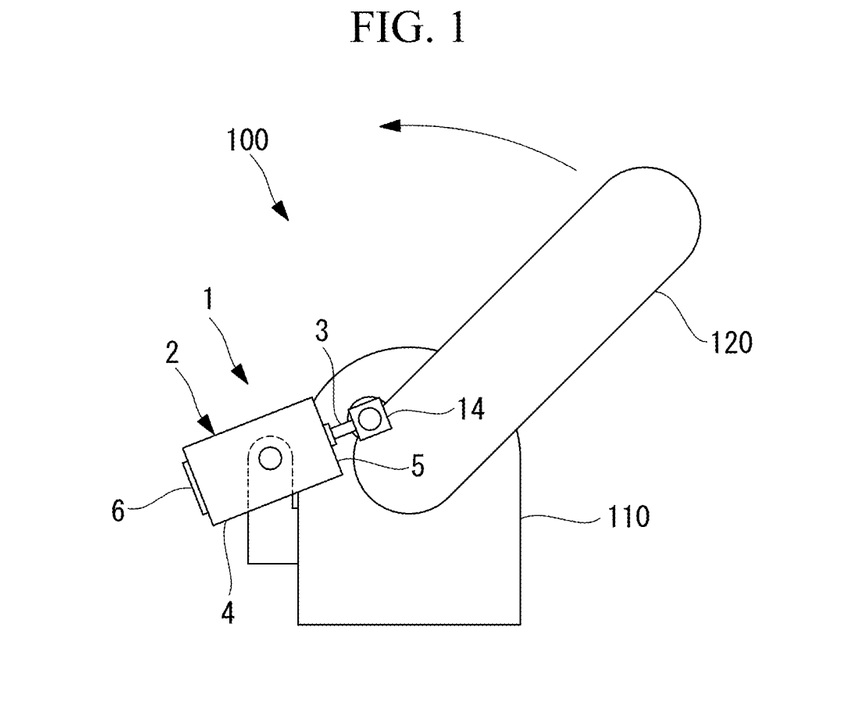
FIG. 1 is a partial view of an exemplary robot with a spring balancer apparatus mounted thereon according to an embodiment of the present invention.

For example, the spring balancer apparatus 1 according to the present embodiment is used for assisting power of a motor (not shown) to drive an arm 120 that is supported so as to be rotatable relative to a base 110 of an upright articulated robot 100 about a gravitational axis of the robot 100, namely a horizontal axis, as shown in FIG. 1.

As shown in FIG. 1, the spring balancer apparatus 1 includes a casing 2 swingably supported by the base 110, and a shaft 3 swingably attached to the arm 120.

Figure 2:
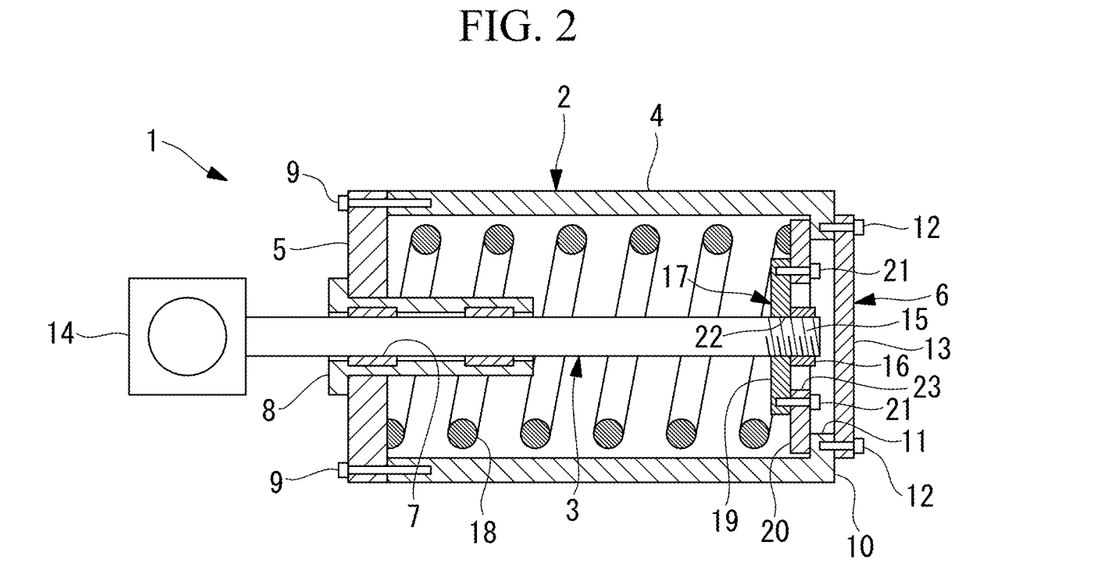
FIG. 2 is a longitudinal sectional view showing an initial state of the spring balancer apparatus of FIG. 1.

As shown in FIG. 2, the casing 2 includes a cylindrical casing body (cylindrical body) 4, a front end plate 5 and a rear end plate 6 closing respective ends of the casing body 4, and a sliding bearing 8 disposed inside a through-hole 7 in the front end plate 5 to support the shaft 3 so that the shaft 3 can move in a longitudinal direction.

The front end plate 5 is removably attached to the casing body 4 with bolts 9.

The rear end plate 6 is provided integrally with the casing body 4 and includes a peripheral part 10 protruding like an inner flange at a rear end of the casing body 4 and having a central opening 11, and a lid 13 removably attached to the peripheral part 10 with bolts 12 to close the opening 11. The peripheral part 10 serves as an abutting part on which an outer periphery of a second flange member 20 (described later) abuts.

An attachment block 14 is attached to one end of the shaft 3 outside the casing 2, and the other end of the shaft 3 inside the casing 2 is provided with an external thread (the first external thread) 15.

Figure 3:
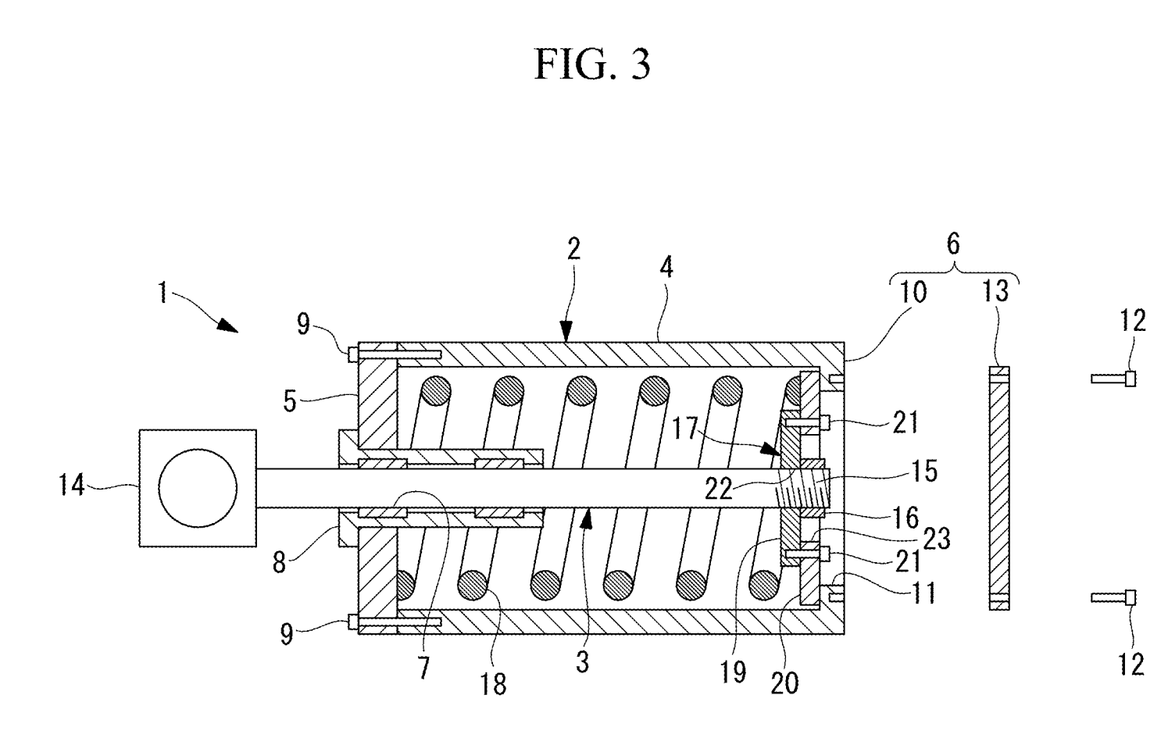
FIG. 3 is a longitudinal sectional view showing the state where a lid is removed from the spring balancer apparatus of FIG. 2.
Figure 4:
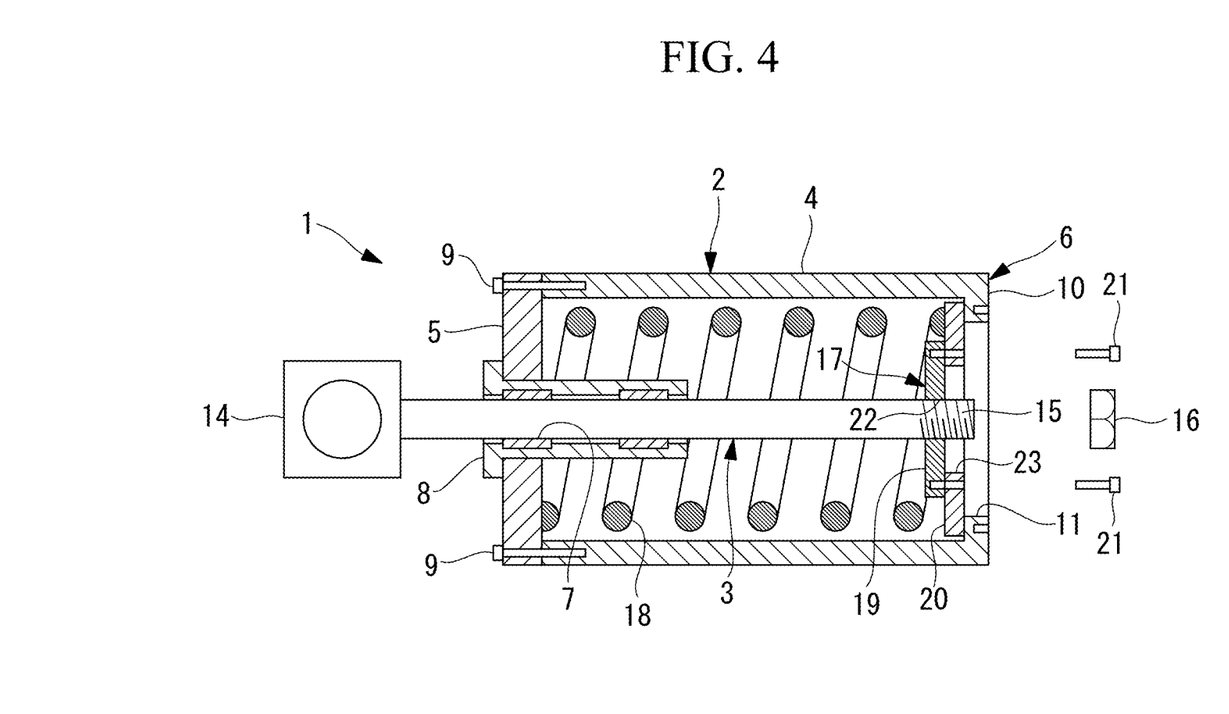
FIG. 4 is a longitudinal sectional view showing the state where bolts for fastening a first flange member to a second flange member and a first nut member fastened to an external thread on a shaft are removed from the spring balancer apparatus of FIG. 3.

As shown in FIGS. 3 and 4, the spring balancer apparatus according to the present embodiment includes a flange 17 attached to and held by the other end of the shaft 3 with a nut member (the first nut member) 16 fastened to the external thread 15, and a compression spring 18 placed in a compressed state between the flange 17 and the front end plate 5.

The flange 17 includes a disk-like first flange member 19 having a diameter sized to fit radially inside the compression spring 18, and a second flange member 20 placed on an outer periphery of the first flange member 19 in a plate thickness direction and then removably attached to the first flange member 19 with bolts (fastening tool) 21 from the rear end plate 6 side.

The first flange member 19 includes at its center a through-hole 22 allowing for passage of the shaft 3. With the other end of the shaft 3 passing through the through-hole 22, the nut member 16 is fastened to the external thread 15 on the shaft 3 from the rear end plate 6 side. This holds the first flange member 19 in place so that it does not fall off the other end of the shaft 3.

The second flange member 20 includes a central hole 23 having a lager inner diameter than an outer shape of the nut member 16. The compression spring 18 is a coil spring having a diameter sized to fit between the front end plate 5 and the second flange member 20.

A description will now be given of a jig 200 for disassembling the spring balancer apparatus 1 according to the present embodiment.

Figure 5:
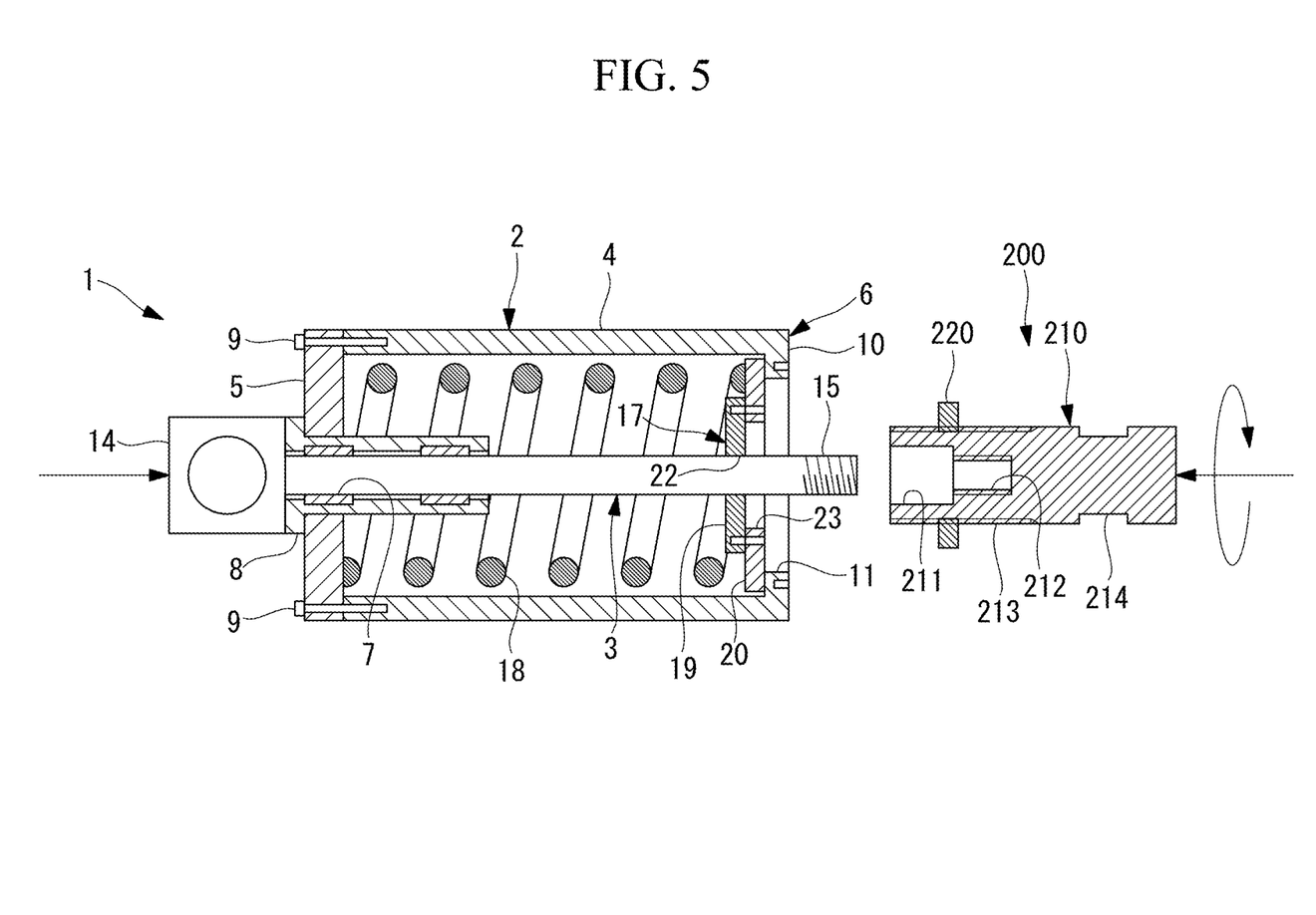
FIG. 5 is a longitudinal sectional view showing the state where a jig is attached using the external thread on the shaft of the spring balancer apparatus of FIG. 4.

As shown in FIG. 5, the jig 200 includes a jig body 210 and a nut member (the second nut member) 220. The jig body 210 is formed in a columnar (cylindrical) shape and includes a central hole 211 axially running from a distal end of the jig body 210 to an intermediate axial position therein, and an internal thread 212 on an inner surface of the central hole 211 for fastening thereto of the external thread 15 on the shaft 3.

The depth of the central hole 211 is set such that the distal end of the jig body 210 abuts on a surface of the first flange member 19 as the external thread 15 on the shaft 3 positioned with its attachment block 14 abutting on the front end plate 5 is getting fastened to the internal thread 212 on the central hole 211.

The jig body 210 further includes an external thread (the second external thread) 213 on its outer surface near the central hole 211 side distal end. The nut member 220 is fastened to the external thread 213. In the present embodiment, the external thread 213 and the internal thread 212 on the jig body 210 are reverse-threaded relative to each other.

The jig body 210 further includes, near its rear end, a pair of flat portions 214 for engagement of tools such as s spanner. The flat portions 214 radially face each other.

Figure 9:
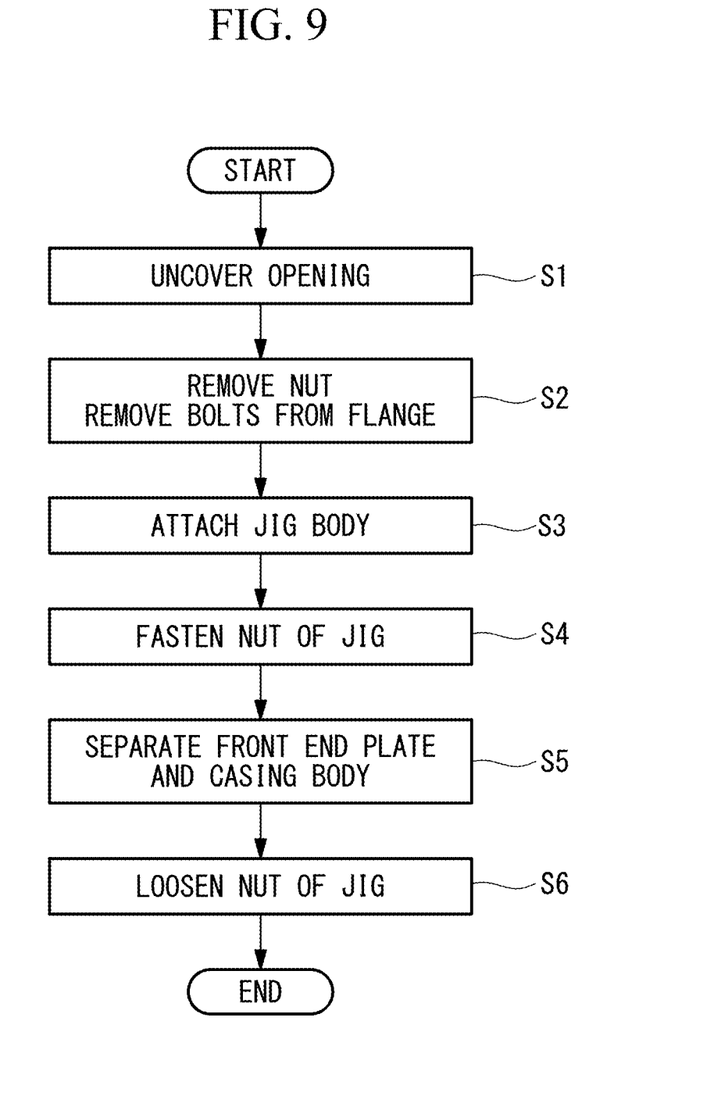
FIG. 9 is a flowchart explaining a method for disassembling the spring balancer apparatus of FIG. 1.

Referring to the flowchart of FIG. 9, below a description will be given of a method for disassembling the above configured spring balancer apparatus 1 according to the present embodiment.

The disassembling method according to the present embodiment relates to disassembling the spring balancer apparatus 1 after it is removed from the robot 100, as shown in FIG. 2.

The state shown in FIG. 2 is a preload state where the compression spring 18 in the casing 2 is extended by its resilient force so as to push the second flange member 20 against the abutting part, namely the peripheral part 10 of the rear end plate 6. This means that the compression force of the compression spring 18 is received by the front end plate 5 and the rear end plate 6 of the casing 2, which makes it difficult to remove the bolts 9 fixing the front end plate 5 to the casing body 4.

The disassembling method according to the present embodiment begins with removing the lid 13 of the rear end plate 6 from the rear end plate 6 by loosening the bolts 12 to uncover the opening 11, as shown in FIG. 3 (step S1).

Then, as shown in FIG. 4, the nut member 16 exposed to the uncovered opening 11 is loosened from the external thread 15 on the shaft 3 and thus removed, and also the bolts 21 fixing the second flange member 20 to the first flange member 19 are loosened and removed (step S2).

Then, as shown in FIG. 5, the shaft 3 is moved in the longitudinal direction to make the attachment block 14 abut on the front end plate 5, and the external thread 15 on the shaft 3 is fastened to the internal thread 212 on the central hole 211 of the jig body 210 inserted from the opening 11 of the rear end plate 6.

Figure 6:
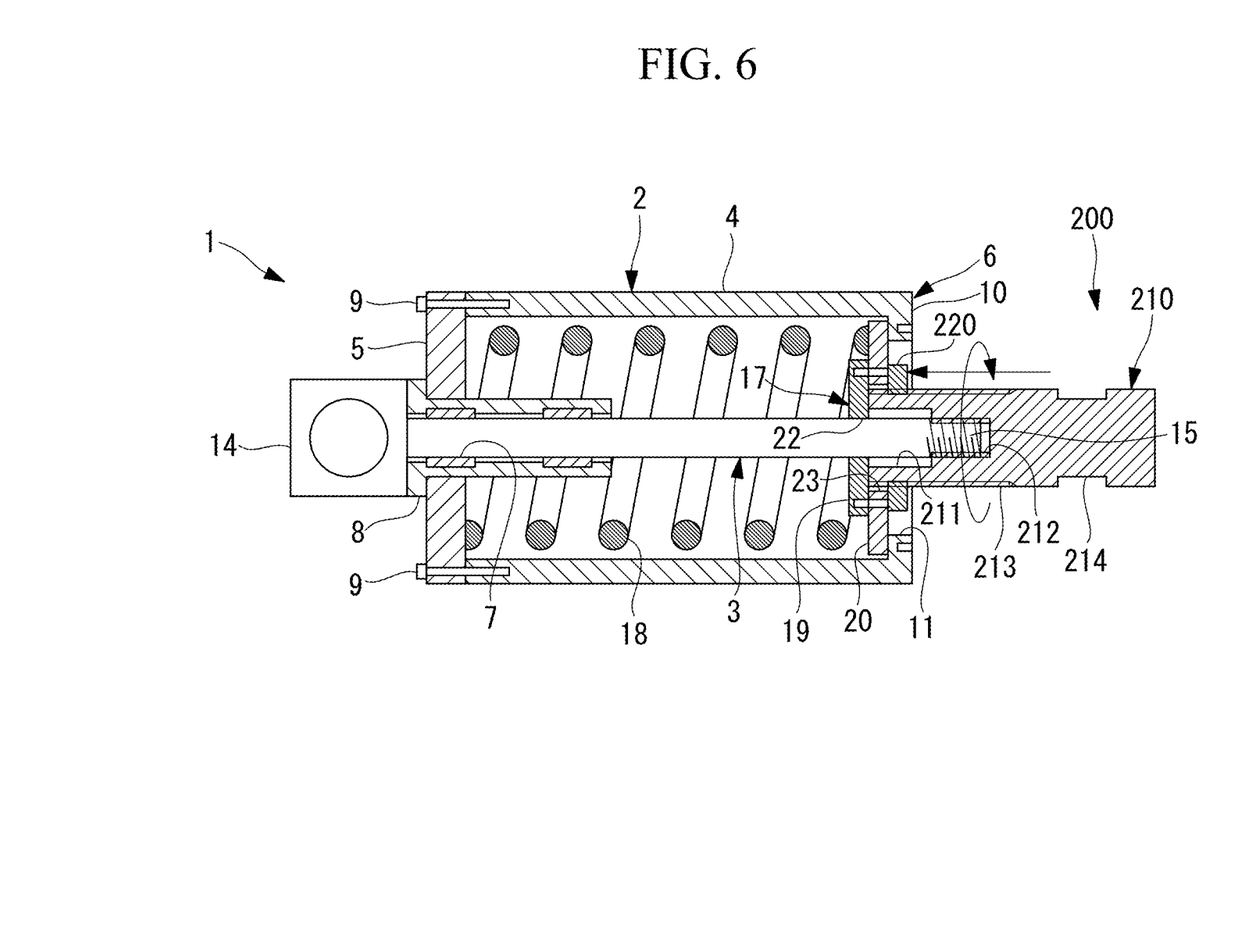
FIG. 6 is a longitudinal sectional view explaining an operation to fasten a second nut member of the jig attached to the spring balancer apparatus of FIG. 5.

This positions the jig 200 at a position where the distal end of the jig body 210 is in tight contact with the surface of the first flange member 19, as shown in FIG. 6 (step S3).

In this state, the nut member 220 fastened to the external thread 213 on the outer surface of the jig body 210 is rotated relative to the external thread 213 as indicated by an arrow in FIG. 6 and moved to a position where the nut member 220 abuts on the surface of the second flange member 20 (step S4). On completion of step S4, the attachment block 14 and the nut member 220 of the jig 200 fixed to the respective ends of the shaft 3 can prevent widening of space between the front end plate 5 and the second flange member 20.

This means that the compression force of the compression spring 18 that has been received by the front end plate 5 and the rear end plate 6 of the casing 2 is now taken over by the attachment block 14 and the nut member 220 of the jig 200 coupled by the shaft 3.

Figure 7:
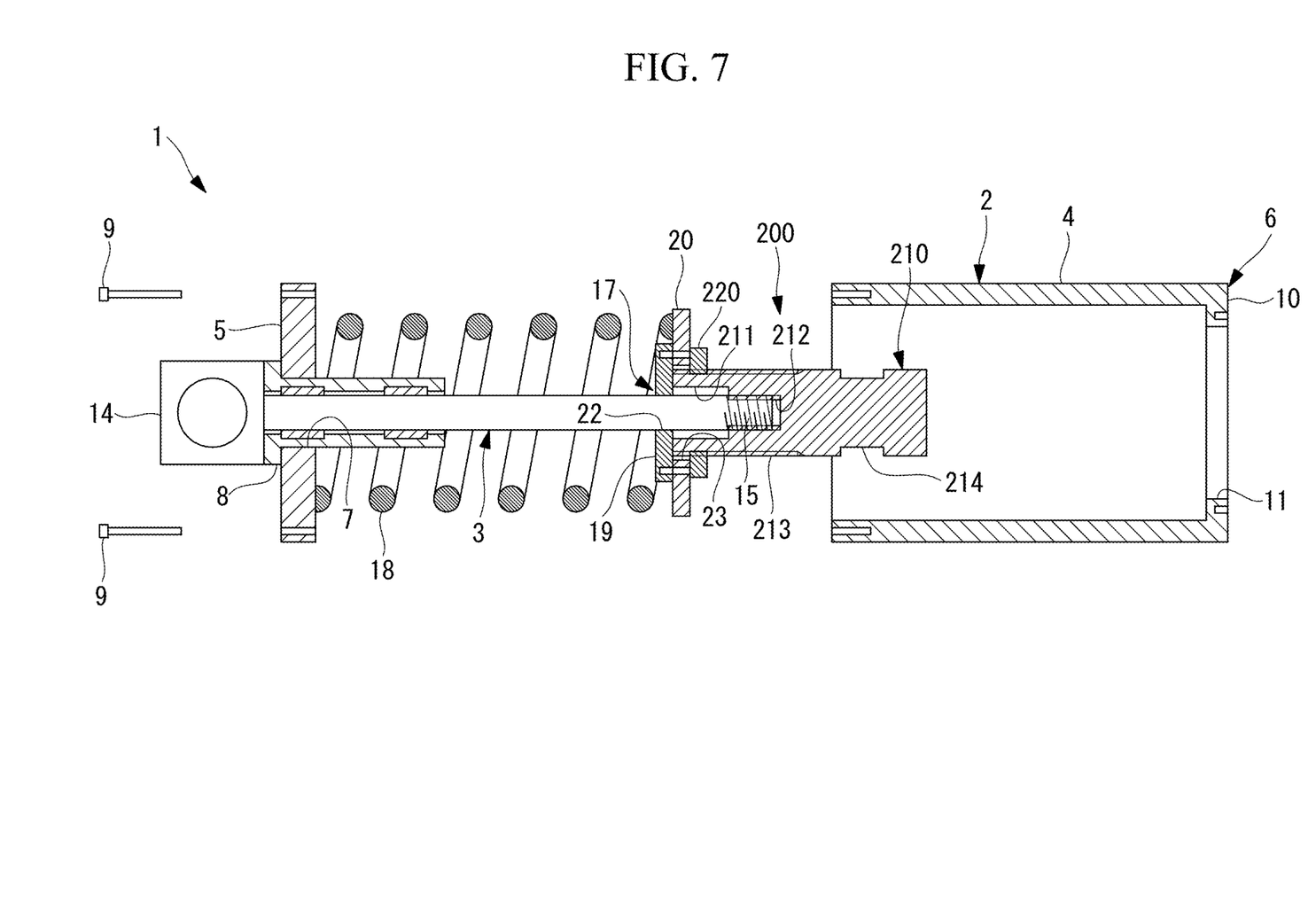
FIG. 7 is a longitudinal sectional view showing the state where a casing body is removed from a front end plate by removing the bolts of the spring balancer apparatus of FIG. 6.

Thus, even when the bolts 9 fixing the front end plate 5 to the casing body 4 are removed, the compression force of the compression spring 18 remains unrelieved. This allows to remove the casing body 4 from the front end plate 5 by removing the bolts 9, as shown in FIG. 7 (step S5).

Figure 8:
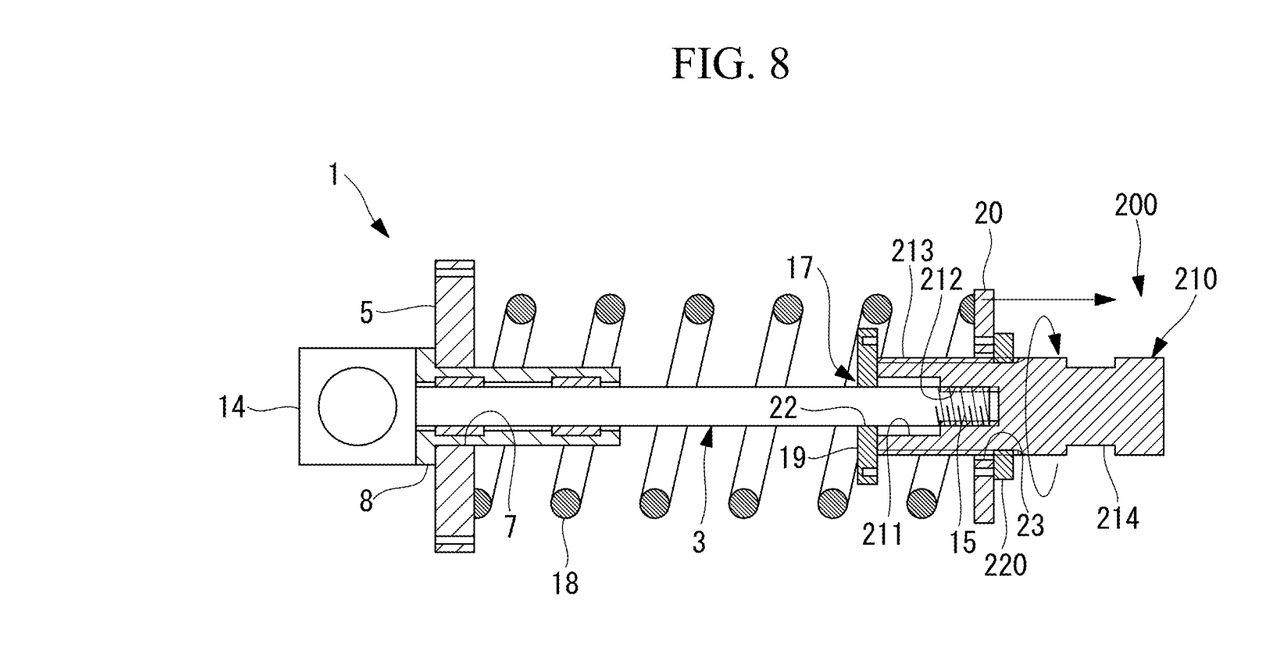
FIG. 8 is a longitudinal sectional view explaining an operation to relieve a compression force of a compression spring by loosening the second nut member of the jig attached to the spring balancer apparatus of FIG. 7.

Then, the nut member 220 is rotated relative to the external thread 213 on the jig body 210 as indicated by an arrow in FIG. 8 to be moved gradually back toward the rear end side of the jig body 210 (step S6).

Once the nut member 220 is moved back to a position where the compression force of the compression spring 18 is completely relieved, the spring balancer apparatus 1 can be disassembled.

Thus, advantageously, the spring balancer apparatus 1 and the method for disassembling the spring balancer apparatus 1 according to the present embodiment allow for easy disassembly with the simple jig 200 without having to use a press machine.

In other words, advantageously, this allows for easy disassembly and disposal of the spring balancer apparatus 1 and easy maintenance thereof, such as replacement of its components including the casing 2 and the compression spring 18, on the site where a press machine is unavailable.

Further, in the present embodiment, the opening 11 in the rear end plate 6 is closed by the lid 13. This can seal the casing 2 and prevent entry of dust and mist. Also, the lid 13 is removed at the time of disassembly, which enables an easy disassembly work.

In the present embodiment, the internal thread 212 and the external thread 213 on the jig body 210 are reverse-threaded relative to each other. Advantageously, this reliably prevents loosening between the internal thread 212 on the jig body 210 and the external thread 15 on the shaft 3 even when the jig body 210 rotates by friction between the nut member 220 and the jig body 210 during an operation to relieve the compression force of the compression spring 18 by rotating the nut member 220 as shown in FIG. 8.

Figure 10:
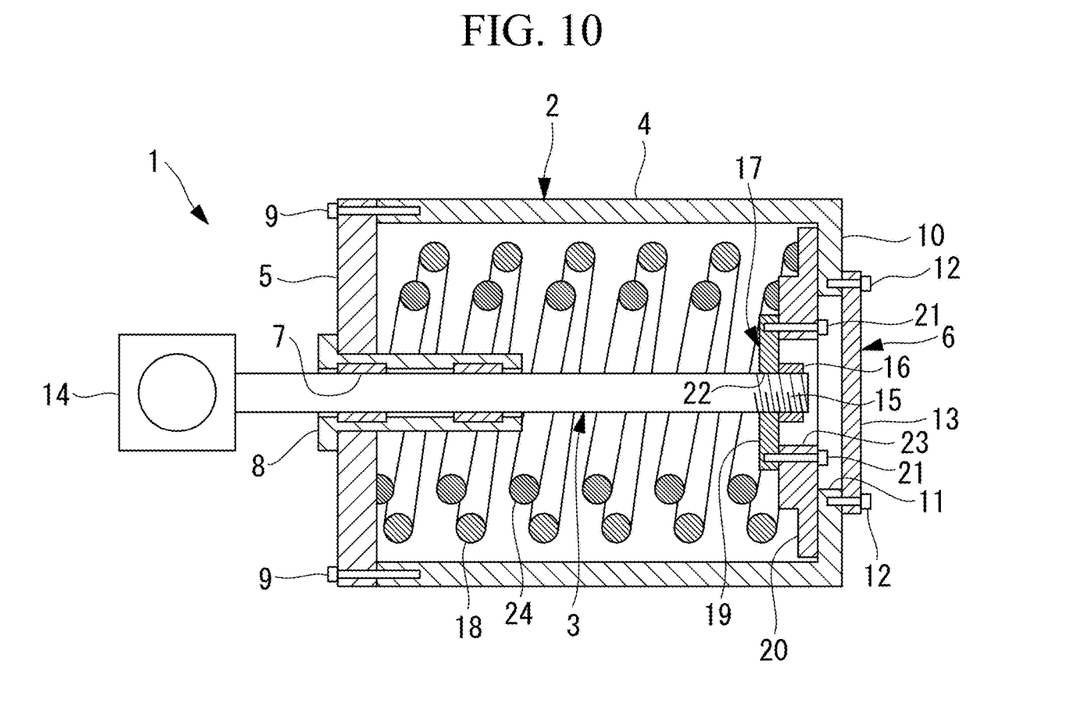
FIG. 10 is a longitudinal sectional view showing a first modification of the spring balancer apparatus of FIG. 1.

In the present embodiment, the spring balancer apparatus 1 contains a single compression spring 18 inside the casing 2, but this is by way of example only; as shown in FIG. 10, the present invention is applicable to the spring balancer apparatus 1 containing multiple compression springs 18, 24.

Figure 11:
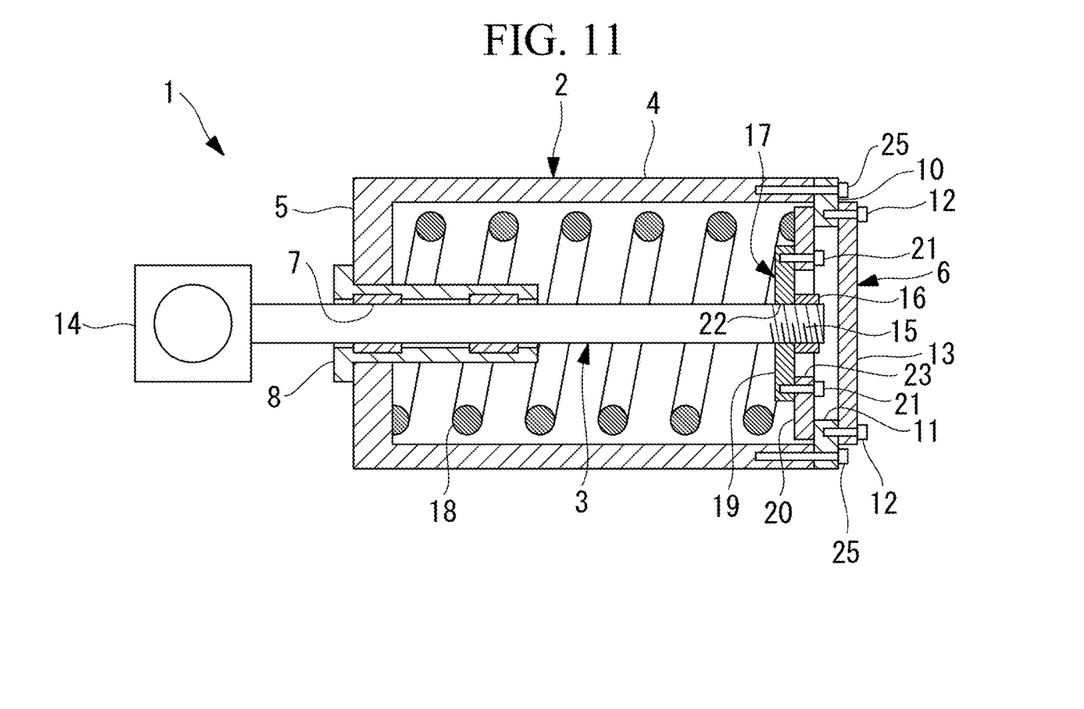
FIG. 11 is a longitudinal sectional view showing a second modification of the spring balancer apparatus of FIG. 7.
Figure 12:
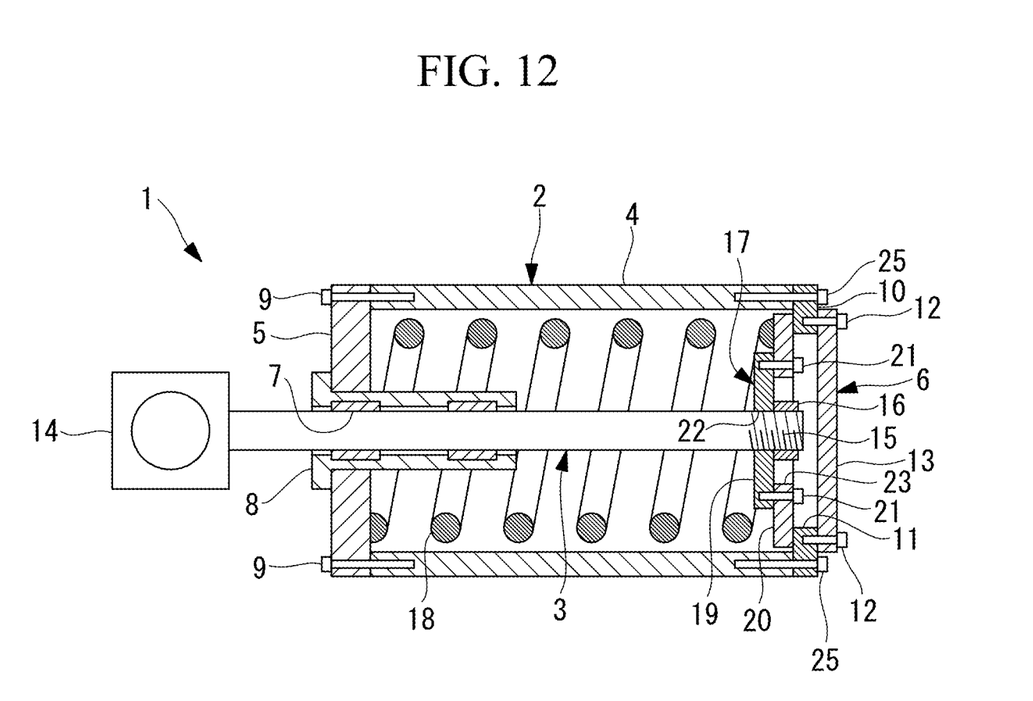
FIG. 12 is a longitudinal sectional view showing a third modification of the spring balancer apparatus of FIG. 7.

In the present embodiment, the casing body 4 and the rear end plate 6 are integrally formed and the casing body 4 and the front end plate 5 are separably fixed with the bolts 9, but this is by way of example only; instead of this, the casing body 4 and the front end plate 5 may be integrally formed and the casing body 4 and the rear end plate 6 may be separably fixed with the bolts 25, as shown in FIG. 11. Still alternatively, both of the front end plate 5 and the rear end plate 6 may be separably fixed to the casing body 4 with the bolts 9, 25, as shown in FIG. 12.

Although the above external thread 213 and internal thread 212 on the jig 200 are reverse-threaded relative to each other, they may be threaded in the same direction. In that case, the flat portions 214 may be held with a tool to prevent rotation.

As a result, the above-described embodiment leads to the following aspects.

An aspect of the present invention is directed to a spring balancer apparatus including: a casing including a cylindrical body, a front end plate, and a rear end plate, the front end plate and the rear end plate being positioned to close respective ends of the cylindrical body; a shaft positioned to pass through the front end plate in a plate thickness direction so as to be movable in a longitudinal direction; an attachment block fixed to one end of the shaft, the one end of the shaft being positioned outside the casing; a flange fixed to another end of the shaft, the another end of the shaft being positioned inside the casing; and a compression spring positioned in a compressed state between the front end plate and the flange, wherein the another end of the shaft is provided with a first external thread, the flange includes a through-hole allowing for passage of the shaft, and further includes a first flange member and a second flange member, the first flange member being positioned radially inside the compression spring, the first flange member being removably held on the another end of the shaft by a first nut member fastened to the first external thread, the second flange member including a central hole allowing for passage of the first nut member, the second flange member being removably fixed to an outer periphery of the first flange member from the rear end plate side by a fastening tool, the rear end plate includes an abutting part on which an outer periphery of the second flange member abuts, and an opening through which a surface of the second flange member is externally exposed at a position radially inside the abutting part and radially outside the central hole, and at least one of the front end plate and the rear end plate is removably fixed to the cylindrical body.

According to the above aspect, the cylindrical body and the attachment block fixed to one end of the shaft are attached to a robot so as to be rotatable about an axis parallel to a rotational axis of the robot. When, along with operation of the robot, the shaft is moved in a direction in which the shaft is pulled out of the casing, the compression spring is further compressed between the flange and the front end plate, which generates a resilient force acting in a direction in which the shaft is pulled into the casing. This assists power of the robot.

The spring balancer apparatus according to the present embodiment is disassembled as follows: in the state where the spring balancer apparatus is removed from the robot, namely where the compression spring is maximally extended in the casing such that the outer periphery of the second flange member abuts on the abutting part of the rear end plate, the first nut member is removed from the first external thread on the another end of the shaft through the opening in the rear end plate. Also, the fastening tool securing the second flange member to the first flange member is removed through the opening.

Then, a cylindrical jig that includes an inner hole provided with an internal thread for fastening of the first external thread on the shaft thereto and an outer surface smaller in outer diameter than a diameter of the central hole of the second flange member and provided with a second external thread engaged with a second nut member is inserted from the opening into the casing, and the first external thread is fastened to the internal thread. The attachment block is thereby made to abut on the front end plate, so that the second nut member of the jig abuts on the second flange member.

This causes the compression force of the compression spring is held by the attachment block and the second nut member coupled by the shaft, and thus at least one of the front end plate and the rear end plate is removed from the cylindrical body. In this state, the second nut member is loosened from the second external thread on the jig to gradually widen the space between the front end plate and the second flange member. This allows to gradually relieve the compression force of the compression spring. In other words, the above aspect allows to disassemble the spring balancer apparatus with a simple jig without having to use a press machine.

In the above aspect, the rear end plate may include a lid configured to removably close the opening from outside.

With this configuration, the lid is attached to the rear end plate to close the opening and thus seal the casing, which can prevent entry of dust and mist. The lid is removed at the time of disassembly, which enables an easy disassembly work.

Another aspect of the present invention is directed to a method for disassembling the spring balancer apparatus having any one of the above aspects, the method including:

removing the first nut member and the fastening tool in a state in which the second flange member is abutted against the abutting part; fastening the first external thread to the internal thread to push the attachment block against an outer surface of the front end plate in a state in which a front end face of a cylindrical jig is abutted against a surface of the first flange member, the cylindrical jig including an inner hole provided with an internal thread for fastening of the first external thread thereto, the cylindrical jig including an outer surface smaller in outer diameter than a diameter of the central hole and provided with a second external thread engaged with a second nut member, and in this state; fastening the second nut member relative to the second external thread until the second nut member abuts on the surface of the second flange member; separating the front end plate or the rear end plate from the cylindrical body; and loosening the second nut member.

In the above aspect, preferably, the second external thread and the internal thread are reverse-threaded relative to each other.

This configuration reliably prevents loosening between the first external thread on the shaft and the internal thread on the jig even when the jig attached to the shaft is made to rotate as a whole by torque applied to the second nut member to rotate and loosen the second nut member from the second external thread.

The present invention allows to disassemble the spring balancer apparatus with a simple jig without having to use a press machine.

The invention claimed is:

1. A spring balancer apparatus comprising:
   a casing including a cylindrical body, a front end plate, and a rear end plate, the front end plate and the rear end plate being positioned to close respective ends of the cylindrical body;
   a shaft positioned to pass through the front end plate in a plate thickness direction so as to be movable in a longitudinal direction;
   an attachment block fixed to one end of the shaft, the one end of the shaft being positioned outside the casing;
   a flange fixed to another end of the shaft, the another end of the shaft being positioned inside the casing; and
   a compression spring positioned in a compressed state between the front end plate and the flange, wherein
   the another end of the shaft is provided with a first external thread,
   the flange includes a through-hole allowing for passage of the shaft, and further includes a first flange member and a second flange member, the first flange member being positioned radially inside the compression spring, the first flange member being removably held on the another end of the shaft by a first nut member fastened to the first external thread, the second flange member including a central hole allowing for passage of the first nut member, the second flange member being removably fixed to an outer periphery of the first flange member from the rear end plate side by a fastening tool,
   the rear end plate includes an abutting part on which an outer periphery of the second flange member abuts, and an opening through which a surface of the second flange member is externally exposed at a position radially inside the abutting part and radially outside the central hole, and
   at least one of the front end plate and the rear end plate is removably fixed to the cylindrical body.

2. The spring balancer apparatus according to claim 1, wherein the rear end plate includes a lid configured to removably close the opening from outside.

3. A method for disassembling the spring balancer apparatus according to claim 1, the method comprising:
   removing the first nut member and the fastening tool in a state in which the second flange member is abutted against the abutting part;
   fastening the first external thread to the internal thread to push the attachment block against an outer surface of the front end plate in a state in which a front end face of a cylindrical jig is abutted against a surface of the first flange member, the cylindrical jig including an inner hole provided with an internal thread for fastening of the first external thread thereto, the cylindrical jig including an outer surface smaller in outer diameter than a diameter of the central hole and provided with a second external thread engaged with a second nut member, and, in this state:
   fastening the second nut member relative to the second external thread until the second nut member abuts on the surface of the second flange member;
   separating the front end plate or the rear end plate from the cylindrical body; and
   loosening the second nut member.

4. The method for disassembling the spring balancer apparatus according to claim 3, wherein the first external thread and the second external thread are reverse-threaded relative to each other.

* * * * *